United States Patent [19]

Halsey et al.

[11] 3,710,236

[45] Jan. 9, 1973

[54] MAGNETIC LEAKAGE FIELD FLAW DETECTOR UTILIZING PARTIALLY OVERLAPPING HALL PROBES

[76] Inventors: Homer P. Halsey; John F. Halase, III, both of c/o Youngstown Sheet and Tube Company, P.O. Box 900, Youngstown, Ohio 44501

[22] Filed: Nov. 30, 1970

[21] Appl. No.: 93,546

[52] U.S. Cl. ................................................... 324/37
[51] Int. Cl. ............................................. G01g 33/12
[58] Field of Search ............ 324/37, 40, 45; 307/309; 332/32 H

[56] References Cited

UNITED STATES PATENTS

| | | | |
|---|---|---|---|
| 2,351,944 | 6/1944 | Engler | 324/37 |
| 3,579,099 | 5/1971 | Kanbayashi | 324/37 |
| 1,998,952 | 4/1935 | Edgar et al. | 324/37 |
| 2,855,549 | 10/1958 | Kuhrt et al. | 324/45 |
| 3,609,530 | 9/1971 | Johnson | 324/37 |
| 3,125,719 | 3/1964 | Seabury, Jr. | 324/37 |
| 3,619,769 | 11/1971 | Kusenberger | 324/37 |

FOREIGN PATENTS OR APPLICATIONS 950,696   2/1964   Great Britain ........................ 324/37

*Primary Examiner*—Robert J. Corcoran
*Attorney*—John Stelmah

[57] ABSTRACT

Method and apparatus for detecting flaws in nondestructive testing of material having a longitudinal extent, e.g., in welds of butt-welded pipe, through the use of a flux energizer having magnetic poles adapted to impart flux to said material in a path transverse to said extent, and a pair of flux sensors. The flux sensors comprise a pair of overlaying Hall generator devices arranged so that a line extending between the voltage lead connection points of one device is parallel to a corresponding line of the other device and to a line transverse to the ambient flux path.

6 Claims, 8 Drawing Figures

PATENTED JAN 9 1973
3,710,236
SHEET 2 OF 2
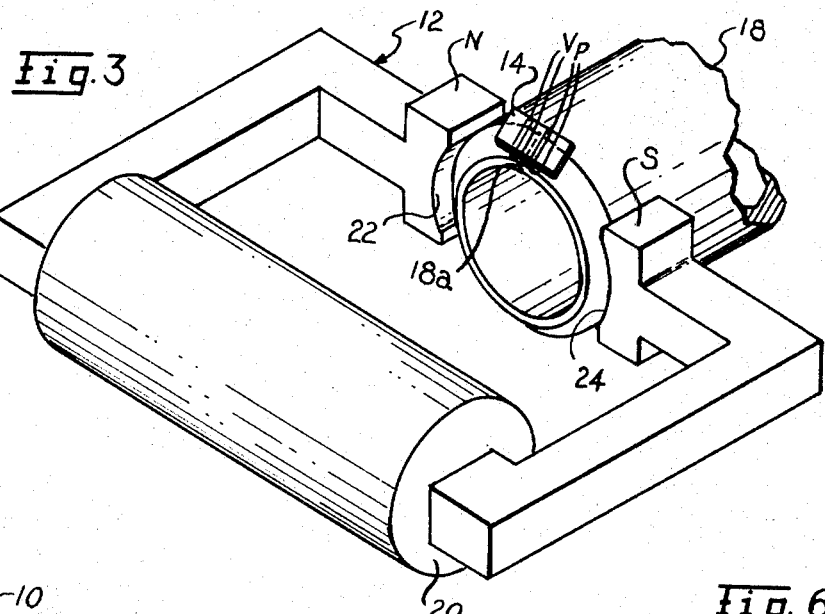
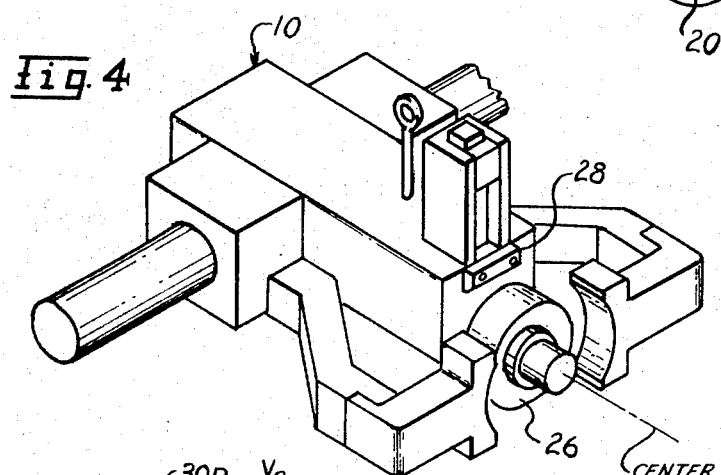
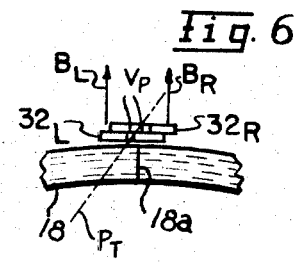
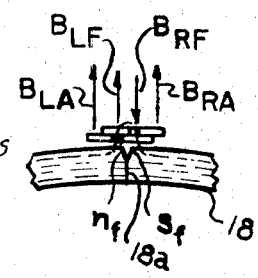
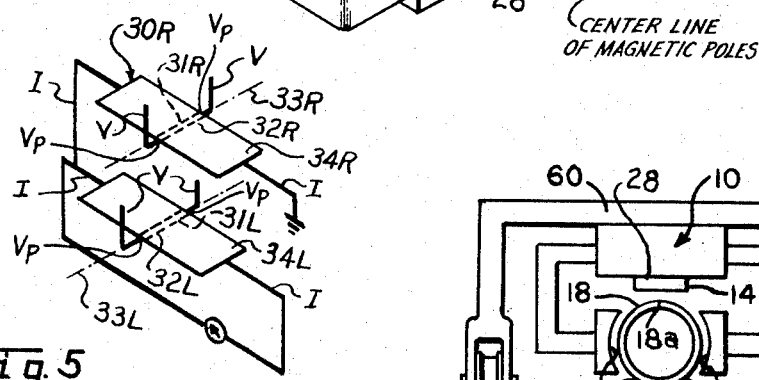
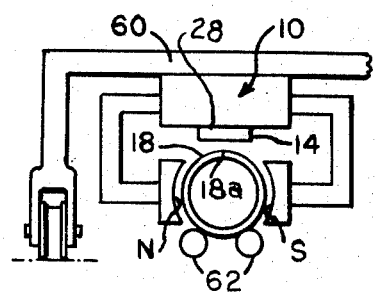
INVENTORS:
HOMER P. HALSEY
JOHN F. HALASE III
by John Stelmah
THEIR ATTORNEY

MAGNETIC LEAKAGE FIELD FLAW DETECTOR UTILIZING PARTIALLY OVERLAPPING HALL PROBES

BACKGROUND OF THE INVENTION

This invention relates generally to non-destructive detection and testing for flaws through the use of a magnetic field, and particularly to the interceptor sensing and depicting of minute flaws, such as hairline cracks, through the use of a magnetic flux leakage detector system.

Some of the features of this invention are particularly adapted for the detection of "end-cracks" which develop or occur in the welds of buttweld pipe. However, these features will also prove useful and advantageous in conjunction with the detection of cracks throughout the extent of a longitudinal weld and/or of other flaws which have a longitudinal extent.

In the non-destructive detection of flaws in products formed of or containing magnetic material, it is desirable to provide a system which not only performs with a high degree of accuracy but which will also discriminate certain types of flaws from other flaws, particularly those other flaws which may not be objectionable. This desideratum is particularly important in the "end-crack" detection of buttweld pipe welds.

Magnetic flux leakage detectors are known in the art. One of the methods for detecting flaws by the flux leakage process consists of imposing a magnetic field in the test specimen and sensing the distortion of the flux pattern which occurs adjacent any defect in the specimen. The distorted flux is sensed by an electromagnetic search coil which generates a signal. However, such search coils are radial velocity dependent and in such arrangements the output signal is proportional to the rate of change of flux per time unit. Also, such search coils are unwieldy and inherently limited because of their size and configuration, particularly in connection with large diameter tests specimens. Further, another disadvantage of such method and apparatus is the inability to discriminate "cracks" from other types of flaws or irregularities.

Eddy current type method and apparatus have also been employed for detecting flaws. However, they are deficient in some of the same respects as are the sensing coils, e.g., inability to discriminate cracks from other flaws. Also, such method and apparatus are very sensitive to surface irregularities, to out-of-roundness of the test specimen (when testing cylindrical specimens), and are extremely affected by specimen edge effects, to the point of being ineffective in sensing flaws occurring at the edges of specimens.

OBJECTS AND SUMMARY OF THE INVENTION

It is an object of this invention to provide method and apparatus for improving the sensing and measurement of magnetic fields in the detection of flaws in magnetized materials.

It is another object of this invention to provide method and apparatus for preferentially sensing and depicting flaws in magnetizable materials, which flaws have a longitudinal extent.

It is a further object to provide method and apparatus for sensing magnetic flux and translating the sensed flux, to an accentuated output.

It is a still further object to provide method and apparatus which is particularly adapted for sensing and depicting "end-cracks" in welded pipe.

Briefly, the objects are attained by providing means for magnetizing the test specimen and sensing means for sensing the flux leakage which occurs at a flaw in the specimen, which sensing means is characterized by a pair of spaced apart effective sensing regions which are parallel to each other and about a line transverse to the ambient flux path between the poles of the magnetizing means. The most effective sensing regions are positioned on opposing sides of a flaw at the instant when the flaw is relatively moved across one of the sensors. Preferably, the most effective sensing regions are of longitudinal extent and are spaced apart a distance which generally corresponds to the width of weld cracks or other flaws which are generally expected to be encountered. Accordingly, the orientation is such that a plane traversing the longitudinal extents of said regions is not normal to the planes of said regions. Also, preferably, the output generated by one of the sensing devices is subtracted from the output of the other. Thus the outputs generated by ambient flux patterns tend to cancel each other. However, the sensors are adapted to be positioned about a flaw, so that the outputs attributable to the flux pattern of the flaw are opposite in polarity. Accordingly, when the flaw moves across the sensors or when the sensing regions are moved across a "crack", a comparatively sharp impulse, in comparison to other flaw signals, is generated. Means are also provided for selectively filtering, and for amplifying the summarized signal. The signal is then rectified and compared with a preselected set amplitude level. When the amplitude of the summarized signal is greater than the preselected level, an audio and/or visual flaw indicating signal is preferably generated to indicate the reject status of the tested specimen.

DESCRIPTION OF THE DRAWING

The invention will be more fully understood and further objects and advantages thereof will become apparent when reference is made to the following detailed description and to the accompanying drawing, in which:

FIG. 3 is a three-dimensioned schematic representation of magnetizing and flux probing devices in accordance with this invention;

FIG. 4 is a three-dimensional view of a preferred type of unit in accordance with this invention embodying the magnetizing and probing devices shown in FIG. 3;

FIG. 5 is a schematic diagram of two conductors of Hall devices defining effective flux sensing regions, which devices form a preferred embodiment of a differential sensing device of this invention;

FIG. 6 is a schematic end view of the conductors shown in FIG. 5, but on conjunction with a fragmentary section of pipe, and illustrating a typical flux pattern;

FIG. 7 is a view similar to FIG. 6, but in conjunction with a section of pipe having a crack flaw positioned intermediate the flux sensing regions and an attendant typical flux pattern;

FIG. 8 is an end elevational view illustrating an arrangement whereby the magnetizing/sensing unit and a pipe test specimen are relatively movable, one to the other, to facilitate scanning of a longitudinal weld of a pipe.

DETAILED DESCRIPTION

Figure 1:
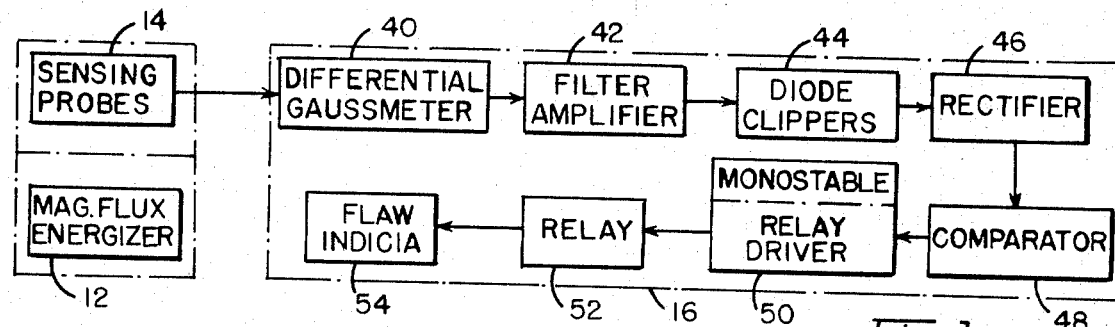
FIG. 1 is a block diagram of an embodiment of this invention, particularly illustrating a preferred embodiment of the electric circuitry for translating sensed magnetic flux to a flaw indicia signal.

In a representative embodiment of this invention as block diagram illustrated in FIG. 1, the apparatus may be considered to be generally comprised of three sections, generally designated as: a magnetic flux energizer 12, an sensing device 14; and an output translating section 16, for translating the sensed flux to a flaw signal. The energizer section 12 and sensing unit 14 may be conveniently incorporated in a single hand-holdable unit as shown in FIG. 4 and generally designated and referred to as energizer sensing unit 10.

The magnetic flux energizer section 14 preferably includes an electromagnet 20 (FIG. 3) having core pole sections N & S adapted to be positioned about the circumference of a test workpiece, such as pipe 18. The end faces 22 and 24 of poles N & S, respectively, are preferably positioned as closely as feasibly possible to the circumferential surface of the workpiece 18, without touching and with reasonable allowance for out-of-roundness. When testing for "end-crack" flaws in the end weld portion of a pipe, for which testing this invention is particularly adapted, the magnetizer/sensing unit 10 may be conveniently provided with mandrel 26 for centering the pipe 18 in respect to the poles N & S. Separate mandrels 26 may be provided for each size range (inside diameter) of pipe. The pole pieces N & S may also be detachably mounted to facilitate positioning and selection of pole piece sections with end face curves adapted to the outside diameter of the pipe to be tested. Alternatively, the mandrel may be of the expansible type and thus accommodate several sizes of pipe. However, in large scale commercial operations it is preferable to provide a separate unit 10 to accommodate each size range of pipe.

The unit 10 is also preferably provided with a mounting assembly 28 for suitably positioning the effective sensing regions of sensing device 14 in a plane corresponding to the plane through which the line desired to be scanned extends (when viewed from a longitudinal side of the pipe), i.e., with pipe having unbeveled ends, the line would generally be in a horizontal plane when the weld is top-side of the pipe, but with a pipe having a beveled end to be scanned, the line would be considered to be in a plane tilted from the horizontal to a degree corresponding to the degree of bevel. In each case, however, the effective sensing regions extend in a direction transverse to the ambient flux field between poles N & S.

As indicated above, the energizer/probing unit 10 includes a sensing device 14, which in a preferred form includes two Hall devices, designated for convenience as 30R and 30L, the combination forming a differential sensing device. Also for convenience, the corresponding parts of the Hall devices bear corresponding numerals but have letter suffixes corresponding to the respective Hall device, and in the description the letter suffix is omitted when the description is appropriate to both Hall devices. Each of the Hall devices includes a conductor, or semi-conductor, element 31 which includes the preferred sensing region 32 for sensing any magnetic flux lines fringing the surface of the magnetized test workpiece 18. As may be seen in FIGS. 3, 6, and 7, at least a portion of the Hall devices overlay each other, and as may be seen in FIG. 5, the planes of conductors 31 R and 31 L overlay each other, with the planes being defined by the width and length of the conductors. The overlaying is in a direction normal to the position of the surface to be tested, as opposed to being spaced along the surface.

It is understood that heretofore the entire section of the conductor or semi-conductor material in a Hall device has been considered as being the active or sensing area. We have discovered, however, that the region bordering a straight line connecting the voltage lead connection points $V_p$ (voltage lead connecting line) is more sensitive to flux pick-up than other areas of said material. In a preferred embodiment of this invention, the Hall devices are positioned so that their respective voltage lead connecting lines are parallel to each other and transverse to the ambient flux path between the poles and the flux path through the pipe. Thus these regions are designated as the most "effective sensing regions" of longitudinal extent. Unexpectedly, it was discovered that the sensitivity of the sensing devices is increased in the order of 10 to 20 times when they are arranged with their voltage lead connecting lines parallel to each other and transverse to the ambient flux path as compared with an arrangement wherein the current lead connecting lines are parallel to each other and transverse to the ambient flux path. Consequently, such an arrangement renders the method and apparatus of this invention particularly adapted for detecting minute cracks which otherwise might be "lost in the noise."

The two Hall devices 30R and 30L are arranged so that the longitudinal extent 33 of their respective most effective sensing regions 32R and 32L are generally parallel to but spaced from each other. In other words, the orientation may be described as being such that a transverse plane $P_T$, extending through the longitudinal extent of the straight line connecting the voltage lead connection points $V_p$ of device 30R and the corresponding line of device 30L, is not normal to the plane of either device. When the energizer/sensing unit 10 is used for the detection of "end-cracks" in welded pipe, the spacing between the most effective sensing regions is in the general order of one-sixteenth inch. In a unit 10 that has been built and tried, the Hall devices were arranged with a portion of the plastic matrix overlaying the matrix of the other. However, it is envisioned that the two conductor portions 31 could be incorporated in a single matrix.

The conductors 31R and 31L, with their respective sensing regions 32R and 32L, are preferably fixedly positioned, by means of sensing mounting assembly 28, about a line corresponding to the centerline between the poles N & S of energizer 12. The most effective sensing regions 32 are adapted to be positioned about the test piece 18 with their longitudinal extents generally parallel to the longitudinal extent of the test piece 18. Hence, as will be explained and will become apparent hereinafter, the method and apparatus of this invention is particularly adapted to test for weld cracks extending longitudinally in welds of buttweld pipe.

As previously indicated, the two Hall devices 30 may be considered to comprise a differential sensing. The conductors 31R and 31L are electrically connected with a summarizer in the form of differential gaussmeter 40 so that the output voltages developed by Hall devices 30R and 30L are subtracted electronically. The net effect under ambient conditions (in the presence of no flaws) is for the outputs to cancel each other. Thus "noise" and other ambient flux conditions common to both conductors 31R and 31L are cancelled. This effect is schematically illustrated in FIG. 6, where there is shown a typical flux pattern produced by a test specimen section having no flaws in the scanning area of the conductors 31R and 31L. The output voltage e that is developed by differential gaussmeter 40 is proportional to the vector difference of the flux fields $B_R$ and $B_L$ sensed at regions $32_R$ and $32_L$ respectively and may be expressed as $$e = K(B_L - B_R)$$

where $K$ is a constant.

Under "ambient" conditions, the magnitudes of $B_R$ and $B_L$ outputs are substantially equal since they are generated by the same flux pattern. Therefore, if output $B_R$ is subtracted from output $B_L$, the differential gaussmeter 40 will produce a weak or no output.

On the other hand, if a crack or other flaw is present on the surface of the test workpiece 18 and is selectively positioned (the workpiece or the sensing regions being rotatable in respect to each other) so that the effective sensing regions 32R and 32L oppose each other from opposite sides of a crack, a different flux pattern will be sensed. Under such condition, the magnetic flux pattern will fringe and exhibit opposing poles $n_f$ and $s_f$ at the opposing sides of the crack, as schematically illustrated in FIG. 7. When the sensors, in the form of sensing regions 32R and 32L are thus positioned, sensor 32L senses the ambient flux, which may be designated as $B_{LA}$, and the flux of the fringing magnetic lines diverted by the crack, and which may be designated as $B_{LF}$. Correspondingly, sensor 32R senses ambient flux $B_{RA}$ and the flux generated by fringing magnetic lines, designated as $B_{RF}$. When the sensors 32R and 32L are substantially equally spaced about the crack, the fluxes $B_{LF}$ and $B_{RF}$ are substantially equal; however, they will generate outputs which are opposite in polarity, since the fringing magnetic lines move through sensor 32L in a first direction, which for purposes of convenience of illustration may be designated as up or with a positive polarity, and back through sensor 32R in an opposite direction, which may be designated as down or with a negative polarity. Now the flux fields as intercepted or sensed by sensor 32L and 32R may be expressed, respectively as:

$$B_L = B_{LA} + B_{LF}; \text{ and } B_R = B_{RA} - B_{RF}$$

The voltage $e$ that is then developed may be expressed as:

$$e = K(B_{LA} + B_{LF}) - (B_{RA} - B_{RF}).$$

Where $$B_{LA} = B_{RA} \text{ and } B_{LF} = B_{RF},$$

$$e = K(B_{LA} + B_{LF}) - (B_{LA} - B_{LF}) = K(2B_{LF})$$

It will thus be apparent, that method and apparatus are provided for substantially accentuating the output generated by magnetic flux lines sensed adjacent a flaw, such as a longitudinal hairline crack, in contrast to method and apparatus which accentuate the flux pattern of a flawless test specimen section. We selectively "tune" the sensors to a "crack" flux pattern by selectively positioning the sensors 32 apart a distance generally corresponding to the separation of the $n_f$ and $s_f$ poles produced by the crack. The parallel positioning of the longitudinal extents of the sensors 32 with the crack also contributes to increased sensitivity by the apparatus because a maximum number of flux lines, which extend generally normal to the test section surface and across the gap, are sensed. In contrast, those flaws which are not so oriented will produce a weaker output because fewer flux lines are sensed by the sensors 32. Furthermore, the subtraction of one sensor output from the other sensor output results in an effective flaw signal which is virtually free of ambient "noise" and other ambient flux conditions which are sensed and generally incorporated in the final signal output of single probe devices. The development of two output voltages which are attributable to a flaw and which are substantially equal in magnitude but opposite in polarity contributes to the accentuation of a flaw signal.

Figure 2:
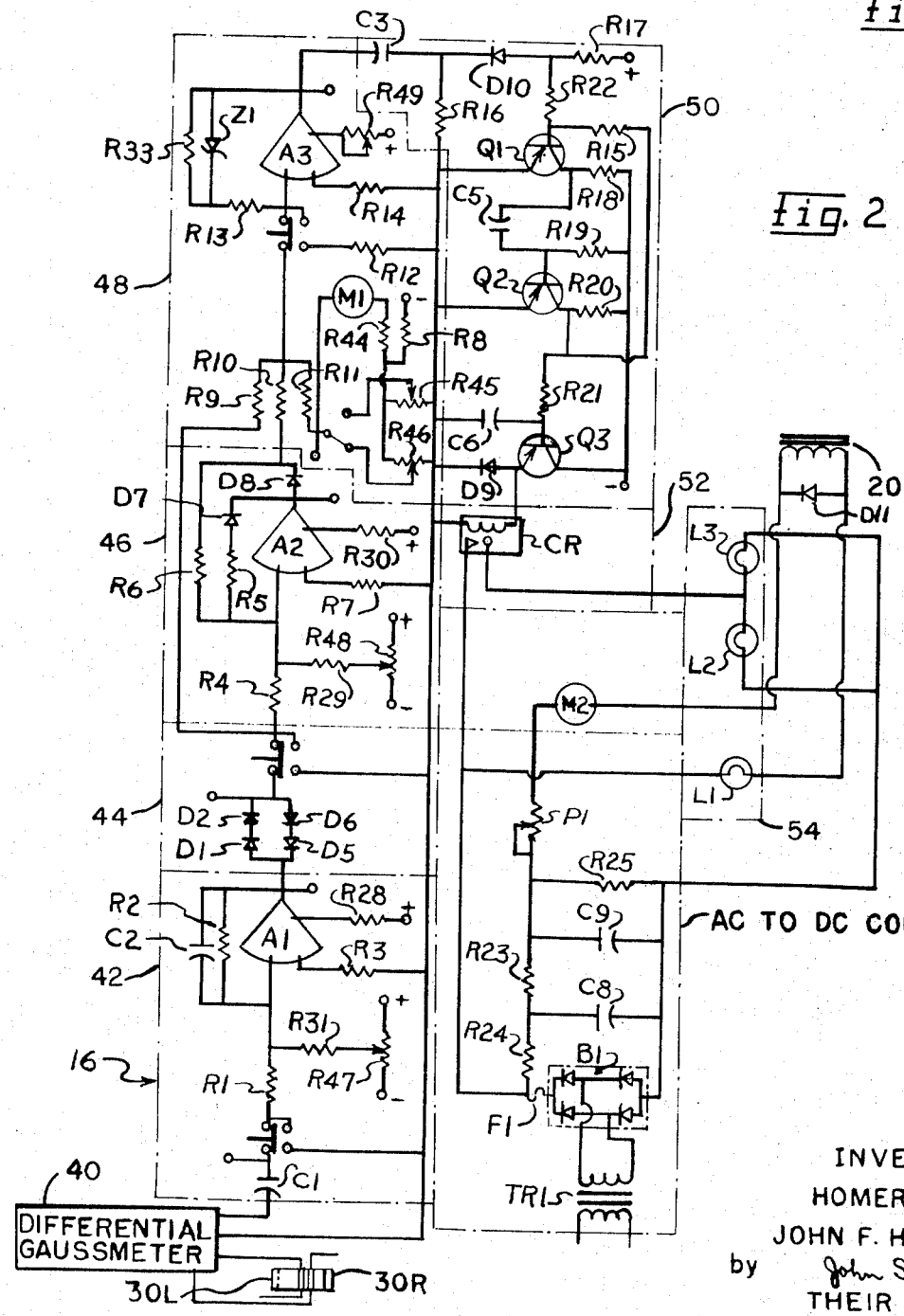
FIG. 2 is a schematic diagram illustrating in more detail the embodiment of FIG. 1.

Additional electronic circuitry is also provided to further selectively amplify and refine the flaw output voltage and will now be described. The pulse output generated by the differential gaussmeter 40 is noise filtered and amplified by means of a high pass filter and amplifier stage 42 formed by means known in the art (FIG. 2). The amplified output is then passed through a diode clipper circuit 44, where only a preselected portion, above or below a preselected magnitude level, is permitted to pass. The "passed" output is then rectified by rectifier circuit 46 so that it may be suitably compared with a preselected level preset in a comparator 48. If the rectified "passed" output deviates from the preset level in the comparator 48, an output is transmitted to a monostable multivibrator 49 to relay driver 50, to drive relay 52. Relay 52 in turn energizes flaw indicator 54. The flaw indicia is preferably in the form of a signal light but may take other form, such as an audible signal.

The method and apparatus of this invention is particularly adapted for testing of flaws which tend to occur at the ends of test work specimens because of the cancellation of "noise" signals which otherwise are usually attendant because of edge effects upon the magnetic flux patterns. However, the concepts of: providing longitudinally and parallel extending flux sensors for traversing opposing sides of areas where longitudinally extending flaws are likely to occur; of translating the outputs of the sensors to cancel ambient condition signals; and of accentuating the output attributable to a sense in change of flux pattern may be utilized in other applications, such as in the scanning of the entire length of the weld in buttweld pipe.

In FIG. 8 there is schematically illustrated an arrangement whereby the entire weld length of the test specimen may be scanned. The energizer/sensing unit 10 is suitably supported by support means 60 so that core poles N & S and sensing device section 14 are radially adjacent to the workpiece 18. Support rails 62 may be provided to support workpiece 18. One or both of the support means 60 and support rails 62 should be movable in a manner to facilitate longitudinal probe scanning of the pipe length. The pipe should also be rotated as it is removed along a longitudinal path so that any point on the pipe will generate a helical line as it advances, a sufficient length of scanning area, whether defined by one or more sensors, should be provided to intercept the length of weld which will advance longitudinally during one revolution of the pipe.

Referring now to FIG. 2 for a more detailed description of the electrical circuitry of this invention:

Resistors R1 and R2 determine the gain of the operational amplifier A1. Resistors R28, R31, and R47 are used to stabilize and balance amplifier A1. Capacitor C1 attenuates low frequency signals, whereas capacitor C2 lowers the amplifier gain for high frequency signals. When used in conjunction with each other, the above circuit elements serve as an amplifier-bandpass filter combination.

Diodes D1, D2, D5, and D6 create a dead zone in the circuits's sensitivity; signal levels between approximately + 1.4 and − 1.4 volts are inhibited by the diodes. This range of signal levels is characteristic of noise levels observed at the output of the first operational amplifier.

Resistors R4, R5, R6, R9, and R10, and diodes D7 and D8, in accord with operational amplifier A2, constitute a rectifier circuit. This portion of the circuitry guarantees that the signal applied to the next portion of the circuit will be of a positive value. This single polarity value makes for easy comparison. Resistors R7, R29, R30, and R48 are used to stabilize and balance amplifier A2.

Resistors R8, R11, R44, R45, and R46 provide an adjustable negative polarity voltage which is indicated on meter M1. This negative voltage serves as a sensitivity adjustment when used in conjunction with operational amplifier A3.

Resistors R13 and R33, and Zener diode Z1 cause A3 to respond as follows: If the negative polarity voltage is larger than or equal to the positive signal from A2, the output of A3 is very near zero volts. If the negative voltage is smaller than the positive signal, the output of A3 goes negative to a value equal to the Zener voltage. This negative output is used to trigger the flaw indication circuitry. Therefore, by varying the magnitude of the negative voltage applied to the input of A3, the positive signal level required to make the A3 output negative is adjustable. Resistors R12, R14, and R49 serve to stabilize and balance A3.

Capacitor C3, resistor R16, and diode D10 serve to condition the negative output of A3 to a signal required to trigger the following circuitry.

Resistors R15, R17, R18, R19, R20 and R22, capacitor C5 and transistors Q1 and Q2 comprises a monostable multivibrator circuit. When triggered by the negative output of A3, this portion of the circuitry generates a pulse approximately one second in duration.

Resistor R21, capacitor C6, diode D9, transistor Q3, and relay CR constitute the relay driver portion of the circuitry. This portion translates the one second pulse into a one second relay closure. The relay closure, in turn, applies voltage to lights L2 and L3, which indicates a flaw has been detected.

Transformer TR1, bridge B1, resistors R23, R24, R25, and P1, and capacitors C8 and C9 convert 110 AC voltage to adjustable DC voltage. Meter M2 indicates the current in the electromagnet. Light L1 indicates the circuitry is energized. Diode D11 protects the windings of the electromagnet from excessive transient voltage spikes. Fuse F1 protects the circuitry from current overloads.

We claim:

1. Apparatus for detecting elongate flaws in a magnetically energized body having a longitudinal extent, comprising:

first and second Hall devices for sensing magnetic flux fringing the surface of said body, each of said devices including a pair of voltage line connection points and being arranged in a manner whereby a straight line extending between said voltage connection points of said first device is generally parallel to a straight line extending between said voltage connection points of said second device and to said longitudinal extent;

said Hall devices being arranged with their respective sensing elements having planes which partially overlay and are parallel to each other, each of said planes being defined by the width and length of the respective element and being taken through the thickness of the element, and so that a transverse plane extending through the longitudinal extents of the straight lines, extending between the voltage connection points of each device, deviates from a line normal to the overlaying planes;

means for providing a flow of current through the conductor of said first Hall device in a first direction;

means for providing a flow of current through the conductor of said second Hall device in a direction opposite to said first direction;

means for transmitting a first voltage signal indicative of the fringing magnetic flux sensed by said first Hall device;

means for transmitting a second voltage signal indicative of fringing magnetic flux sensed by said second Hall device; and means for summarizing said first and second voltage signals and producing an output indicative of the vector difference of said first and second voltage signals.

2. The combination as described in claim 1, wherein:

said Hall devices are adapted to generate voltages of substantially equal magnitudes but of opposite polarity when positioned on opposing sides of a flaw in the body being tested.

3. In magnetic flux detection apparatus for detecting flaws in magnetically energized material, said apparatus including a pair of Hall devices and characterized by:

said Hall devices being arranged with their respective sensing elements having planes which partially overlay and are parallel to each other, each of said planes being defined by the width and length of the respective element and being taken through the thickness of the element;

said Hall devices also being arranged so that a straight line, joining the points where the voltage lead lines are joined to the sensing element of one device, is parallel to a corresponding straight line of the other device;

and so that a transverse plane extending through the longitudinal extents of said straight lines is other than normal to the overlaying planes.

4. In magnetic flux detection apparatus for detecting flaws, said apparatus including magnetic energizer means having magnetic poles for imparting magnetic flux to material to be tested, and a pair of Hall devices for detecting flux fringing the surface of said material, said apparatus being characterized by:

said Hall being arranged in partial overlaying relation in a direction corresponding to a direction normal to the surface to be tested;

and further comprising:

means for positioning said devices so that a straight line, joining the points where the voltage lead lines are joined to the sensing element of one device, is parallel to a corresponding line of the other device; and means for positioning the test material so that said lines of said elements are parallel to each other and to the longitudinal extent of the flaw.

5. In a process of sensing magnetic flux for the detection of flaws in magnetically energized material, the step of:

positioning a pair of Hall generator devices in partially overlaying relation in a direction corresponding to a direction away from the material being tested, in a manner whereby a straight line, joining the points where the voltage lead lines are joined to the sensing element of one device, is parallel to a corresponding line of the other device, and so that a plane extending through the longitudinal extents of said straight lines is other than normal to the planes of said devices, and said material is advanced to position a longitudinally extending crack parallel to and between said straight lines.

6. Apparatus as described in claim 4 wherein:

said devices are positioned so that said straight line and said corresponding line are spaced apart generally one-sixteenth inch in a direction corresponding to the direction of the field between said poles.

* * * * *